US006597706B1

United States Patent
Seery (10) Patent No.: US 6,597,706 B1
(45) Date of Patent: Jul. 22, 2003

(54) PARITY BIT EXTRACTION AND INSERTION ARRANGEMENT FOR A DATA SYSTEM

(75) Inventor: James W. Seery, Manalapan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/228,544

(22) Filed: Jan. 9, 1999

(51) Int. Cl.[7] .................................................. H04J 15/00
(52) U.S. Cl. ...................................... 370/503; 370/512
(58) Field of Search .................................. 370/503, 512, 370/228; 714/800–804; 709/400

(56) References Cited

U.S. PATENT DOCUMENTS

| | | | | | |
|---|---|---|---|---|---|
| 4,914,655 | A | * | 4/1990 | Johannes et al. ............ | 714/800 |
| 5,311,170 | A | * | 5/1994 | Wachi et al. ................ | 370/228 |
| 5,765,009 | A | * | 6/1998 | Ishizaka ...................... | 709/400 |
| 5,959,987 | A | * | 9/1999 | Humphrey et al. .......... | 370/352 |
| 6,243,847 | B1 | * | 6/2001 | McClellan et al. .......... | 714/801 |

* cited by examiner

Primary Examiner—Salvatore Cangialosi (57) ABSTRACT

The design of data network apparatus on an ASIC is enhanced using a parity bit extraction circuit and a parity bit insertion circuit which do such extraction and insertion using a single clock signal and without converting the incoming parallel data stream into a serial data stream.

13 Claims, 6 Drawing Sheets

| FIG. 6 |
|--------|
| FIG. 7 |

PARITY BIT EXTRACTION AND INSERTION ARRANGEMENT FOR A DATA SYSTEM

FIELD OF THE INVENTION

The invention relates to a parity bit extraction/insertion system that processes the data in parallel using a single clock signal.

BACKGROUND OF THE INVENTION

A data receiver typically uses a parity extraction circuit to locate a parity bit contained in a parallel bit stream of data bytes. Usually, the parity bit is the Nth bit in the parallel bit stream, for example, the 65th bit. The parity bit, as is well-known, gives the parity, odd or even, for the preceding bits of the parallel bit stream.

The location of the parity bit may be readily determined by converting the parallel bit stream to a serial bit stream to count the data bits in a conventional manner. The data bit occupying the 65th bit position in the serial stream would then be extracted as the parity bit. It is noted that if the data bytes are received and converted into a serial bit stream at a first clock rate, e.g., a rate of x bits/second, then, they must be counted at a higher data rate of at least mx bits/second. What this means is that at the circuit level, a clock boundary would exist between the two clock rates at the input and at the output of the parity bit extractor circuit.

As is well-known, a designer may use a number of different commercially available software tools to design an Application Specific Integrated Circuit (ASIC). These tools include, for example, timing analysis software, gate synthesis software, layout software, etc. Disadvantageously, such software is not particularly adapted to handle a circuit containing a clock boundary. To deal with this shortcoming, a designer has to partition the circuit at the clock boundary and synthesize the partitioned sections independently using the software tools. However, the timing analysis between the sections as well as the gate synthesis and layout of the interface between the sections must be done manually, which is, indeed, an arduous and complex task to complete properly.

It is apparent from the foregoing that the clock boundary problem would also be applicable to a parity bit insertion circuit.

SUMMARY OF THE INVENTION

The design of data network apparatus on an ASIC is greatly enhanced, in accordance with the invention, by using a parity bit extraction circuit and a parity bit insertion circuit which employ a single clock signal and do not convert the incoming parallel data stream into a serial data stream.

These and other aspects of the claimed invention will be appreciated from the ensuing detailed description and accompanying drawings.

DETAILED DESCRIPTION

Figure 1:
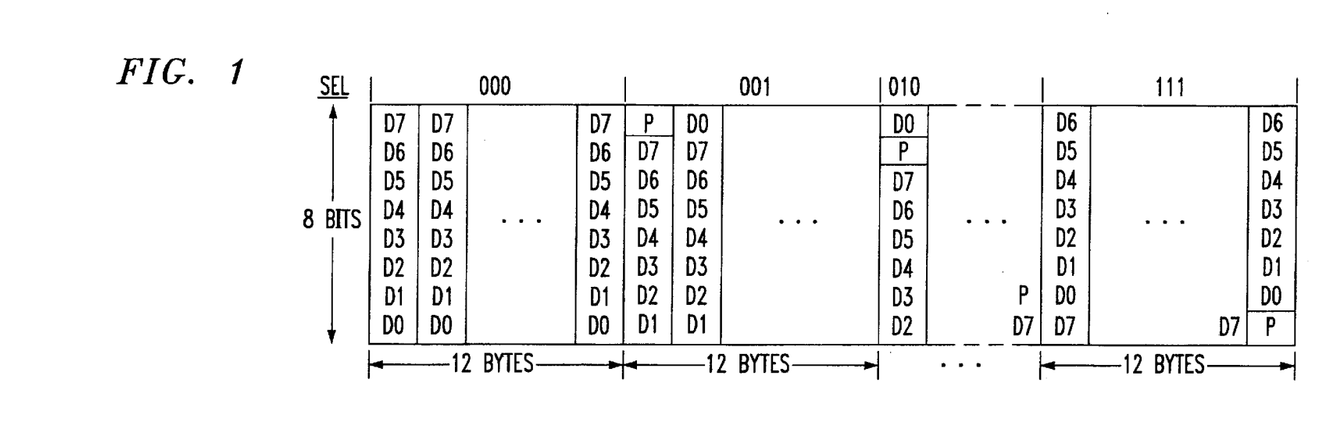
FIG. 1 is an illustrative example of the format of data that is received and transmitted by an illustrative data system.

The instant invention will be discussed in the context of an illustrative data system in which parity is determined over 12 data octets (bytes) of 8 bits each octet. The parity bit is generated over the 12 octets and inserted in the most significant bit position of the succeeding 13th octet. As illustrated in FIG. 1, the parity bit is thereafter inserted in lower succeeding bit positions of respective ones of the succeeding 13th octets until it occupies the least significant bit position. The insertion cycle is repeated when the parity bit reaches the latter bit position. It should be understood of course that the above data format should not be construed as a limitation of the claimed invention, since it will be easily recognized from the following description that the claimed invention may be used in systems that determine parity over fewer or more than 12 data octets and inserts the parity bit into any arbitrary bit position.

Figure 2:
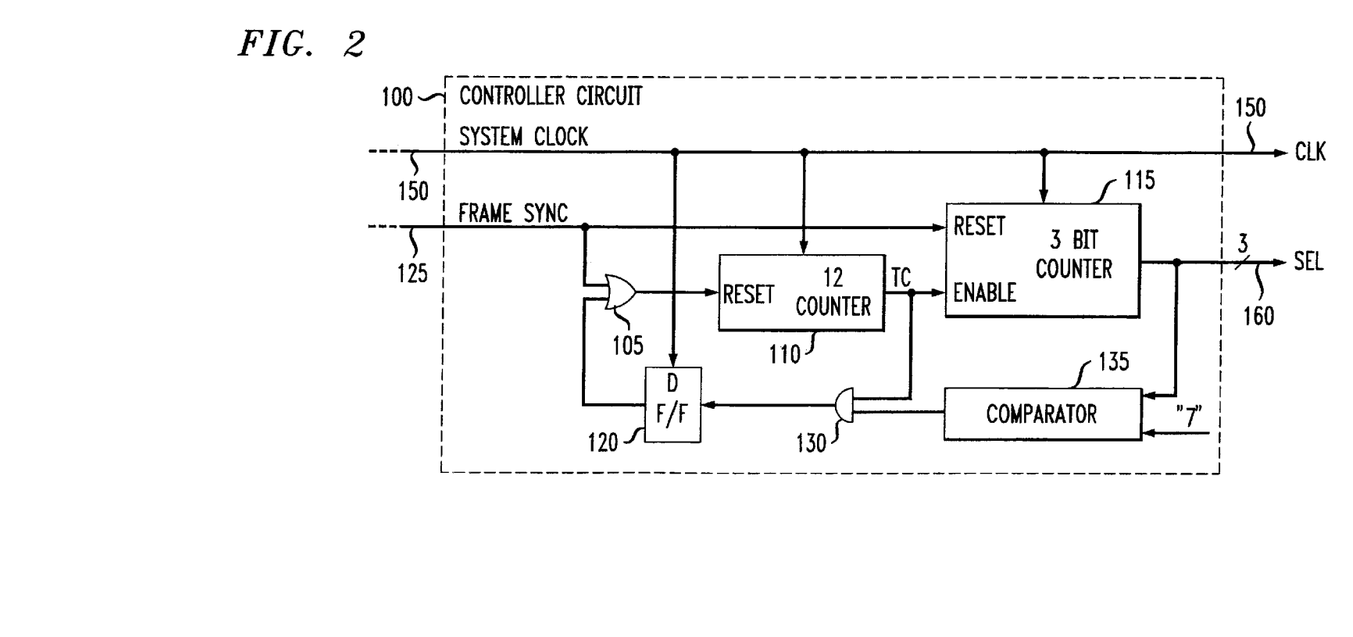
FIG. 2 is a block diagram of a controller that operates in accordance with the principles of the invention to extract a parity bit from parallel data having the illustrative format of FIG. 1.

With that in mind, FIG. 2 illustrates a controller 100 which provides a count for each octet (byte) of a group of 12 octets (bytes) received following receipt of a system sync signal signifying the start of a data frame. The controller also outputs a select signal (SEL) that identifies the respective current bit positions of the data bits and the parity bit. Moreover, since the data is processed in parallel using a single clock signal, CLK, the value of the select signal, SEL, is also used to properly multiplex data bits to an output for processing by a receiver controller (not shown). More specifically, assume that a frame detector circuit (represented in the FIG. by the dashed portion of lead 125) detects the beginning of a system frame and outputs a signal over lead 125 to signify that event. The sync signal on lead 125 causes OR gate 105 to output a reset signal to 12 bit counter 110, which resets counter 110 to a value of zero (000). This primes 12 bit counter 110 to count the next 12 clock pulses that a system clock circuit (represent in the FIG. by the dashed portion of lead 150) generates and outputs to lead 150. The sync signal also resets 3 bit counter 115 to a value of zero (000). When counter 110 counts 12 clock pulses, it outputs an enable signal, TC, to 3 bit counter 115, which enables 3 bit counter 115 to count the next clock pulse on lead CLK and thus advance its current count to a value of one (001). The latter clock pulse also restarts 12 bit counter 110, which removes the enable signal and begins counting starting with the current clock pulse. When the counter 110 has counted the next series of 12 clock pulses it again supplies an enable signal, TC, to 3 bit counter 115. Similarly, 3 bit counter 115 counts the next clock pulse that appears on lead 150, which increments the count in counter 115 to a value of two (010). Counter 115 outputs the count to bus 160 as the SEL signal. Control circuit 100 proceeds similarly with each succeeding series of twelve clock pulses.

Conventional comparator 135 continually compares the binary value of the signal outputted to SEL bus 160 with the hardwired value of binary 7, as is illustrated in FIG. 2.

Comparator 135 outputs a signal to one input of conventional AND gate 130 when the two values compare with one another. Similarly, when 12 bit counter 110 has completed its next count (indicating that the eighth group of 12 octets have been received, FIG. 1) it again outputs an enable signal to counter 115 and to AND gate 130. The enable signal and the next clock CLK signal increment the count in counter 115 to zero (000). The enable signal and the comparator 135 signal cause AND gate 130 to switch and output a 'set' signal to D type F/F 120. The set signal switches F/F 120 to a set state, which then outputs a signal to OR gate 105. OR gate 105 responds to the latter signal and outputs a reset signal to 12 bit counter 110. The reset signal clears counter 110, thereby effectively removing the enable signal presented to counter 115 and AND gate 130. Controller circuit 100 is thus initialized to repeat the above described counting function.

Figure 3:
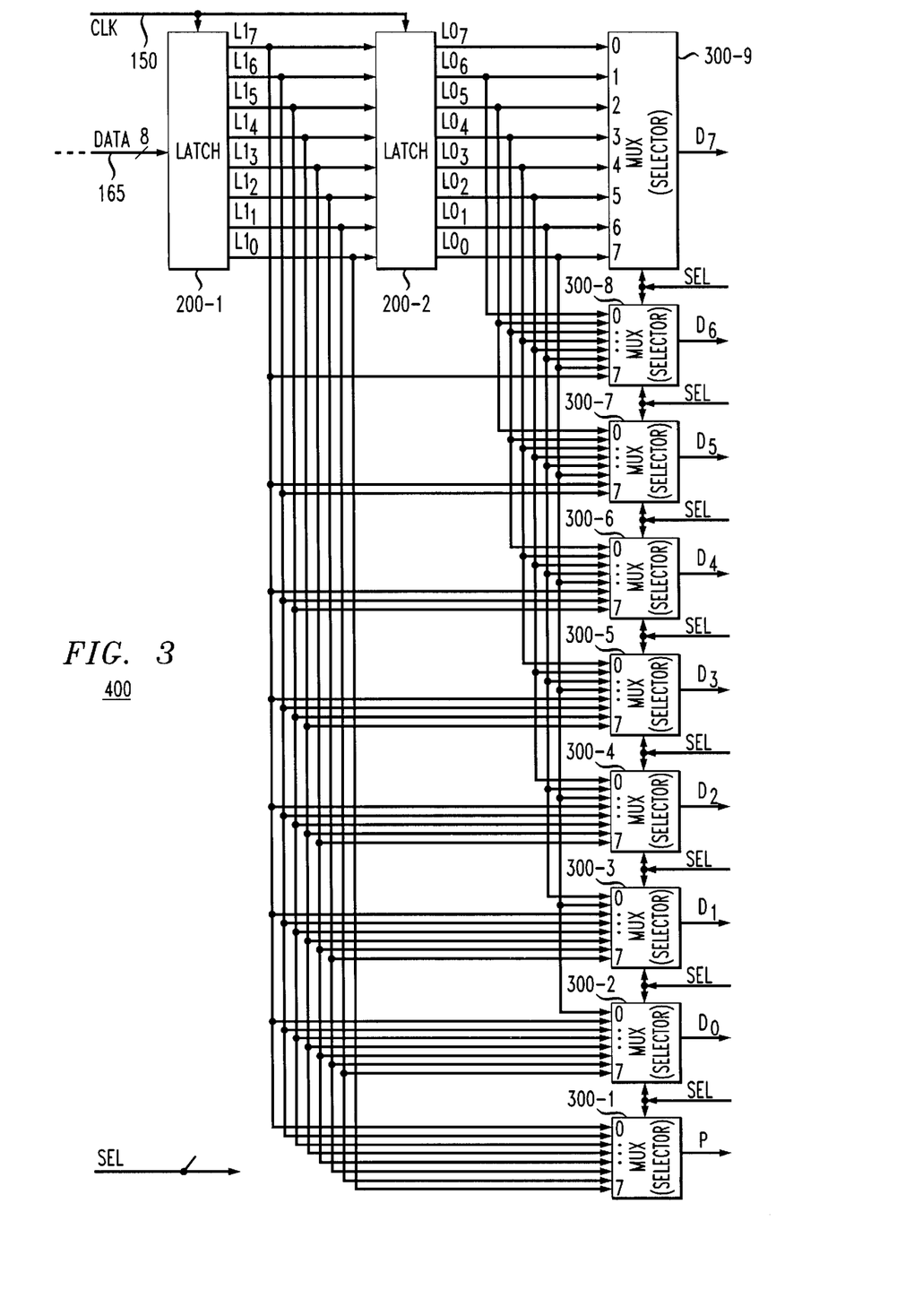
FIG. 3 is a block diagram of an illustrative selector section that used in the extracting of the parity bit.

An illustrative example of an extraction circuit 400 which uses the clock signal, CLK, and the SEL signal to locate and extract the parity bit is shown in FIG. 3. The extraction circuit also reformats the data stream into a proper eight bit format for presentation to a data processor (not shown). More specifically, eight bits of data are received from a receiver section via bus 165 and clocked into 8 bit latch 200-1 upon receipt of a clock signal via the CLK lead 150. The clock signal also "clocks" the output on leads $L1_0$ through $L1_7$ into 8 bit latch 200-2, where they are respectively outputted to leads $L0_0$ through $L0_7$. Latch 200-1 thus stores the most current one of the received octets and latch 200-2 stores the next, second most current one of the received octets. The extraction circuit also includes multiplexers/selectors 300-1 through 300-9 for respectively multiplexing in proper order the parity bit and data bits 0 through 7 of the received octets to corresponding output leads designated P and D0 through D7 in FIG. 3. Extraction circuit 400 thus takes advantage of the way in which the bit position of a data bit or parity bit propagates/circulates through each bit position over the course of 8 groups of octets, each group having 12 octets. Specifically, leads $L0_0$ through $L0_7$ and $L1_0$ through $L1_7$ are wired to the multiplexers 300-1 through 300-9 to correspond with the order of the received sequence of octets shown in FIG. 1 starting from a point of when the value of the SEL signal is 000 to when it is 111. In this way, a multiplexer 300-i multiplexes to its respective output the data signal that appears at that one of its input terminals corresponding to the current value of the SEL signal. For example, when the value of the SEL signal is 000, then a multiplexer 300-i multiplexes the signal that appears at its "0" input terminal to its output terminal. If, on the other hand, the value of the signal on SEL is 011, then multiplexer 300-i multiplexes the signal that appears at its "3" input terminal to its output terminal. Also, since the parity bit is contained in every thirteenth octet, the input to the parity bit multiplexer 300-1 is connected to corresponding output leads of latch 200-1. Thus, multiplexer 300-1 also outputs the signal appearing at that one of its input terminals corresponding to the value of the SEL signal. However, the data processor accepts only the parity bit extracted from the thirteenth data word.

As mentioned above, the clock boundary problem that makes it difficult to implement a parity bit extraction circuit on an ASIC, also makes it difficult to implement a parity bit insertion circuit on an ASIC. I have recognized that this latter problem may also be dealt with by designing an insertion circuit which employs only one clock signal and inserting the parity bit directly into the parallel bit stream. Accordingly, there is not need to convert the parallel bit stream to a serial stream to insert the parity bit, as was done priority.

Figure 4:
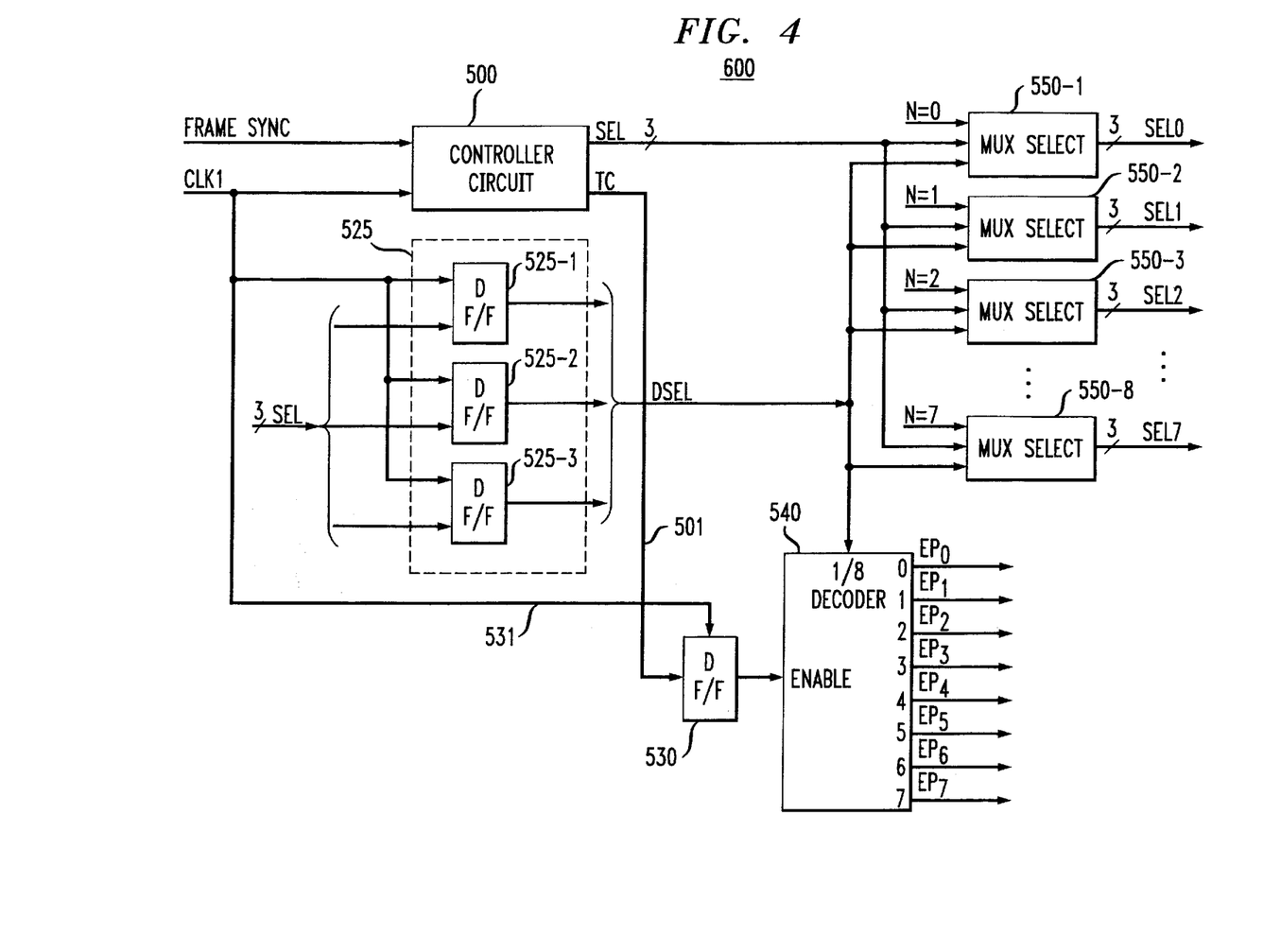
FIG. 4 is a block diagram of an illustrative controller that operates in accordance with the principles of the invention to insert a parity bit in parallel data to create the format of FIG. 1.

The control section 600 for the insertion circuit is shown in FIG. 4 and includes controller circuit 500, DSEL signal generator 525, D F/F 530, 1/8 decoder 540 and multiplexer/selector circuits 550-1 through 550-8. It is noted that controller circuit 500 is similar to controller circuit 100, FIG. 2. For the sake of clarity and brevity, controller 500 will not be described herein since the foregoing description of controller circuit 100 equally pertains to controller circuit 500. DSEL generator 525 is formed from three conventional D type flip/flops 525-1 through 525-3, which are triggered by the clock signal, CLK1, to provide a version of the SEL signal that is delayed by one clock cycle, thus the designation DelayedSEL (DSEL). The controller 500 terminal count signal, TC, extends to the input of conventional D-type F/F 530, which supplies an enable signal to conventional 1/8 decoder 540. Upon receipt of the TC signal on lead 501 and a clock signal, CLK1, on lead 531, 1/8 decoder 540 decodes the SEL signal into a respective one of the output terminals, EP0 through EP7, corresponding to the current binary value of signal SEL. Each of the MUX/select circuits 550-1 through 550-8 is designed to transfer to its output either the SEL signal or the DSEL as a function of the value of N connected to a respective one of its input terminals, as is shown in more detail in FIG. 5. (Note that the values of the different Ns respectively connected to MUX circuits 550-1 through 550-8 are 000 (0) through 111 (7).

Figure 5:
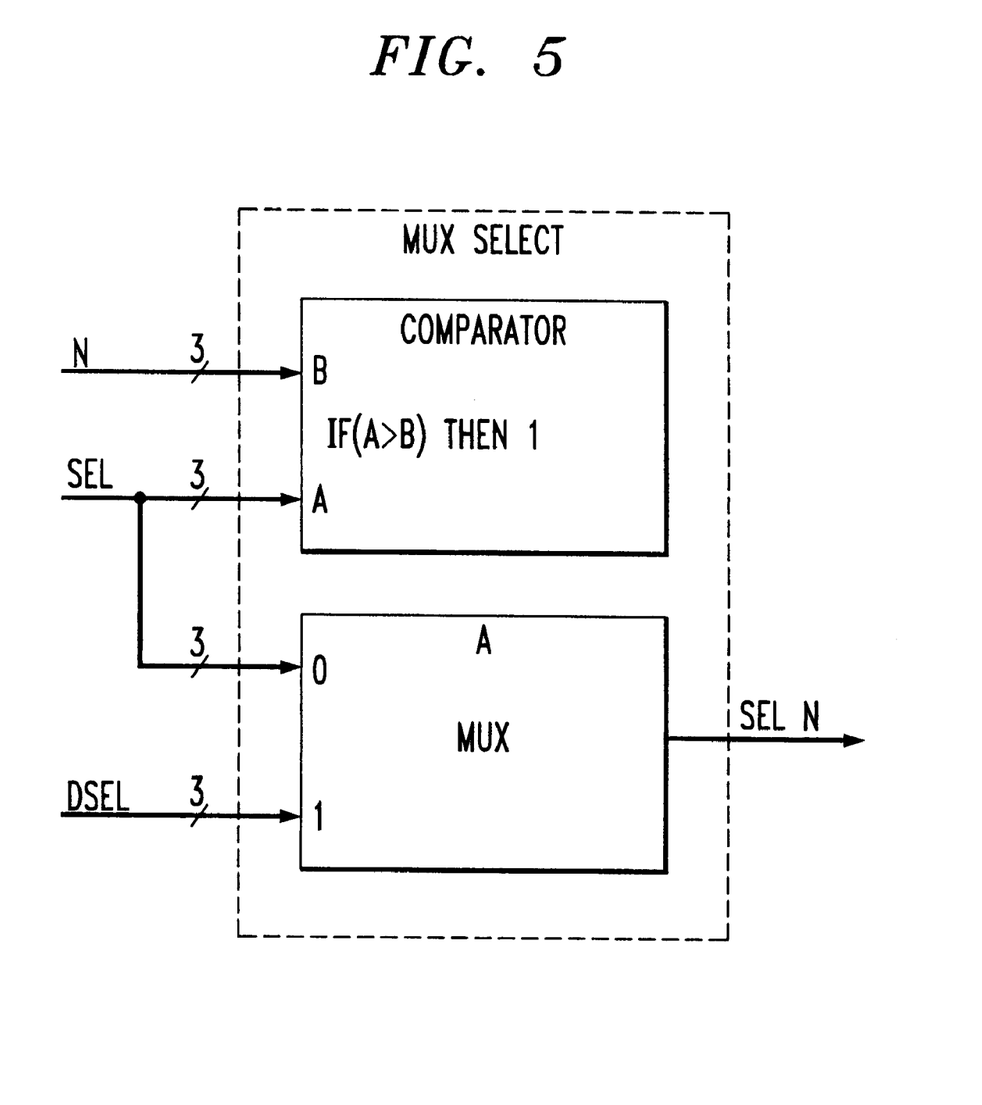
FIG. 5 is an expanded block diagram of a MUX selector circuit of FIG. 4.

Each MUX select circuit 550-i comprises a comparator circuit and a MUX circuit. The comparator circuit compares the value of N with the value of the SEL signal and if the latter value is greater than the former value (i.e., A>B) then the comparator outputs a binary one signal, e.g., a logic one characterized by a positive voltage level, to the MUX circuit. The MUX circuit, in turn, multiplexes the DSEL signal to its output SELN. For example, if N=4, then the MUX circuit outputs the DSEL signal when the value of the SEL signal is >4.

Figure 6:
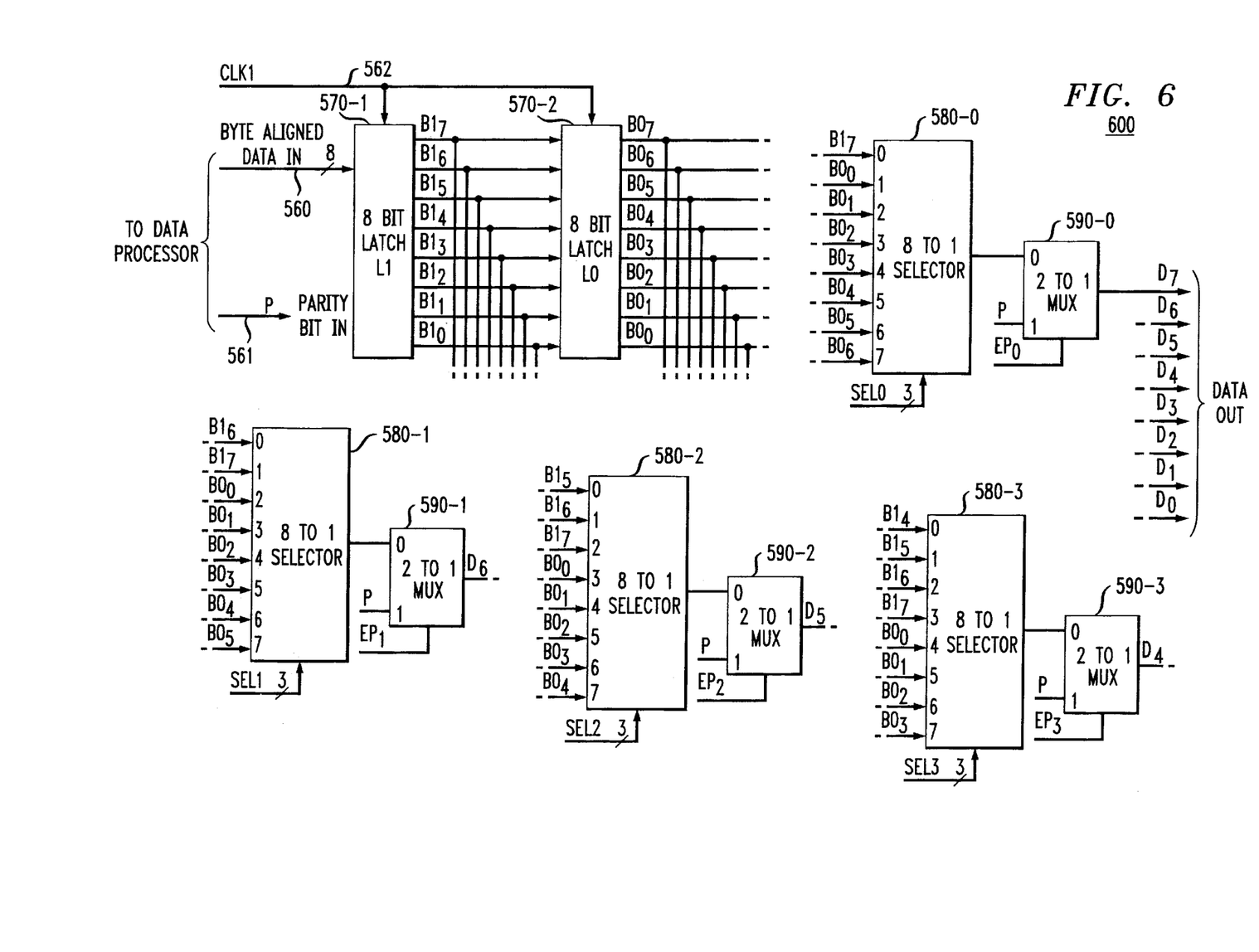
FIGS. 6 and 7 are a block diagram of an illustrative selector/MUX section that is used to insert a parity bit in parallel data to create the data format of FIG. 1.
Figures 7, 8:
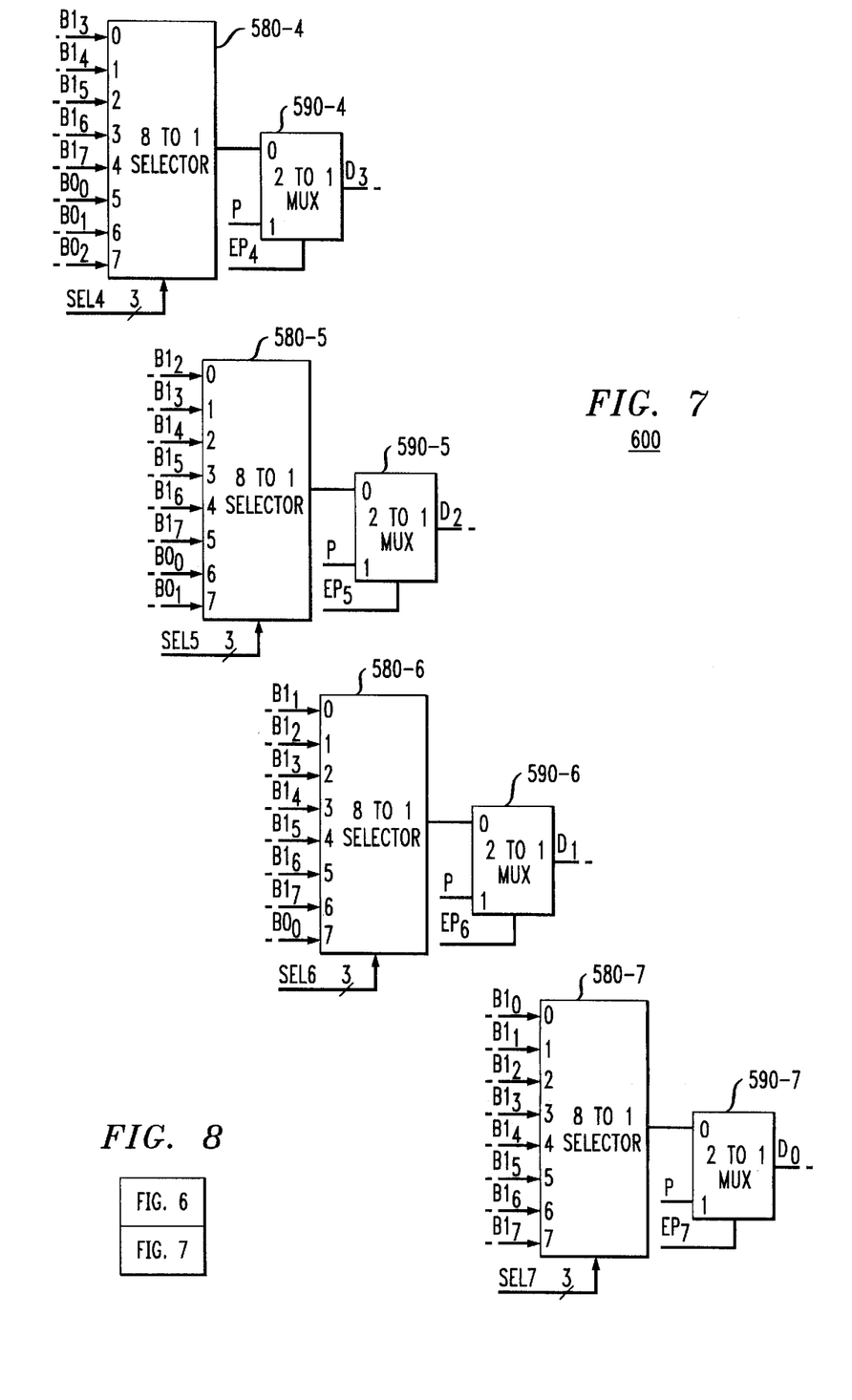
FIG. 8 shows the way in which FIGS. 6 and 7 should be aligned with respect to one another.

The remainder of the insertion circuit is shown in FIGS. 6 and 7, which should be arranged with respect to one another as shown in FIG. 8. Parity bit insertion circuit 600 further includes 8 bit latches 570-1 and 570-2, selector circuits 580-0 through 580-7 and MUX circuits 590-0 through 590-7.

Eight parallel bits of data are received from a data processor section (not shown) via bus 560 and clocked into 8 bit latch 570-1 upon receipt of a clock signal, CLK1, via lead 562. The clock signal, CLK1, also "clocks" the output on leads $B1_0$ through $B1_7$ into 8 bit latch 579-2, where they are respectively outputted to leads $B0_0$ through $B0_7$. Latch 570-1 thus stores the most current one of the octets outputted by the data processor and latch 200-2 stores the next, previous one of the outputted octets. Outputs $B1_0$ through $B1_7$ and outputs $B0_0$ through $B7_0$ are similarly wired to particular ones of the inputs of selectors 580-1 through 580-8. For the sake of brevity and clarity, the actual connections between those outputs and selectors 580-1 through 580-8 are not shown in the FIGs. Insertion circuit also receives from the data processor a parity bit for each 12 octets of data. The parity bit is supplied to each 2:1 MUX 590-0 through 590-7. When an active signal, e.g., a logic one level characterized by a positive voltage level, is placed on a particular $EP_i$ lead, then the MUX 590-i responding to that signal outputs the parity bit to the corresponding bit position, $D_k$.

More specifically, and also referring to FIG. 1, assume that controller circuit 500 has been initialized by the system frame sync signal. Starting at that point, the value of the SEL signal outputted by controller 500 would be 000, which is supplied to each of the MUX selector circuits 550-1 through 550-8 and to generator 525. The value of the DSEL would also be 000. Since the value of SEL signal does not exceed any of the different N values respectively supplied to MUX selector circuits 550-1 through 550-8, then each of those circuits outputs the SEL signal as its respective SELN signal, i.e., signals SEL1 through SEL7, respectively. The 1/8 decoder 540, as a result of being initialized, also supplies a value of 000 to each of its outputs EP0 through EP7.

The SEL0 signal (000) supplied to selector circuit 580-0 causes that selector to select the signal supplied to its respective '0' port, i.e., data bit $B1_7$, and output the selected signal to the '0' input of the associated MUX 590-0. Also, since the value of signal EP0 is currently a zero, MUX 590-0 outputs the $B1_7$ signal supplied to its '0' input port as the D7 data bit. Similarly, since the value of each of the SEL1 through SEL7 signals and each of the EP1 through EP7 signals is also 000, then selector circuits 580-1 through 580-7 operate similarly and output the signal currently supplied their respective '0' input ports to the '0' port of their associated MUX 590-i. As a result of the foregoing, signals $B1_7$ through $B1_0$ form data bits D7 through D0 of the first data byte of the current frame, as is shown in FIG. 1. Since the values of the SEL and DSEL signal will remain at 000 for the next 11 clock signals, and since each of the EP0 through EP7 signals will also be 0 (zero) for that interval, then, selectors 580-0 through 580-7 in combination with their associated ones of the MUXs 590-0 through 590-7 output the data signals supplied to their respective '0' input ports as data bits D7 to D0, respectively, thereby forming the first 12 data bytes of the frame (FIG. 1).

As mentioned above, controller circuit 500 counts the clock pulses, CLK1, and generates a TC pulse when the count reaches twelve, indicating that twelve bytes of data have been received/processed. The TC pulse, as also mentioned, increments the value of the SEL signal to 001. Since N=0<001 for MUX selector 550-1, then MUX selector 550-1 outputs the DSEL signal to selector 580-0 as the SEL0 signal. Also, the value of the DSEL signal is still 000, which is clocked into 1/8 decoder 540 by the TC pulse and clock signal, CLK1. The 1/8 decoder 540 decodes that value and outputs a signal, e.g., a logic one level characterized by a positive voltage level, to its corresponding output terminal, namely terminal '0' connected to the EP0 lead/signal. The active EP0 signal causes 2:1 MUX 590-0 to output the parity bit in the D7 data bit position of the 13th data byte, rather than the data signal supplied by selector 580-0.

Since the current value of the SEL signal does not exceed the different values of N respectively supplied to MUX select circuits 550-1 through 550-8, then those circuits also output the SEL signal as their respective SELN signals.

The respective combinations of the SELN and $EP_N$ signals cause each of the selector circuits 580-1 through 580-7 to output the signal connected to their respective "01" terminals and cause the associated ones of the MUX circuits 590-1 through 590-7 to also output the selected data signal. As such, data signals $B1_7$ through $B1_1$ are outputted as data bits D7 though D1 occupying bits positions 6 through 0 in the data word/byte currently being formed with the parity bit occupying the most significant bit position. This data byte is shown in FIG. 1 as the first data byte of the second group of 12 data bytes.

When the extraction section receives the next data byte somewhat concurrently with the next CLK1 signal, then 1/8 decoder 540 is cleared by the presence of the CLK1 signal and absence of the TC pulse. Also, the DSEL signal is updated to equal SEL by the CLK1 signal currently supplied to generator 525. Since for MUX select circuit 550-1, N=0<SEL, then circuit 550-1 outputs the current value of the DSEL signal (i.e., 001) to selector 580-0. Also, since N=1= SEL for MUX select circuit 550-2, then that circuit outputs the SEL signal as its SEL1 signal. Moreover, since each of the different values of N connected to MUX selector circuits 550-3 through 550-8 are>SEL, then those circuits still output the SEL signal as their respective SELN signal. All of the MUX select circuits 550-i thus output a signal having a value of 001 to their respective 8 to 1 selector circuits 580-i. The 001 signal prompts the respective selector 580-i to output to the associated MUX 590-i the data bit supplied to its respective input terminal 01. Accordingly, selector 580-0 outputs the data signal $B0_0$ for data bit position D7. Also, the respective combinations of the SELN and $EP_N$ signals supplied to selector circuits 580-1 through 580-7 cause those circuits to output the signal connected to their respective "01" terminals and cause the associated ones of the MUX circuits 590-1 through 590-7 to also output the selected data signal. As such, inputs $B1_7$ through $B1_1$ are respectively the data word/byte with the D0 bit occupying the most significant bit position, as shown in FIG. 1 for the second data byte of the second group of 12 data bytes. The third through twelfth data bytes of the second group of data bytes are formed similarly.

When-controller circuit 500 has counted the next group of CLK1 signals and generates another TC pulse, the TC pulse increments the value of the SEL signal from 001 to 010. Since each of the values of N (0 and 1) respectively supplied to MUX selectors 550-1 and 550-2 is less than the current value of the SEL signal, then MUX selectors 550-1 and 550-2 each output the DSEL signal as their respective SELN signals. The current value of the DSEL would be 001. Selector 580-0 responsive to the DSEL signal of 001, outputs the data signal $B0_0$ supplied to its '01' input terminal to MUX 590-0. as the SEL0 signal. Since the current value of the EP0 signal is 0, then MUX 590-0 outputs the signal supplied to its '0' port instead of the signal supplied to its '1' port. As such, the $B0_0$ signal is outputted as the $D_7$ data bit. Similarly, the value of the DSEL signal (001) is again clocked into 1/8 decoder 540 by the TC pulse and clock signal, CLK1. The 1/8 decoder 540 decodes that value and outputs a signal, e.g., a logic one level characterized by a positive voltage level, to its corresponding output terminal, namely terminal '1' connected to the EP1 lead. The EP1 signal causes 2:1 MUX 590-1 to output the parity bit in the D6 data bit position of the 25th data byte, rather than the data signal supplied by selector 580-1.

Since the current value of the SEL signal (010) does not exceed the different values of N respectively supplied to MUX select circuits 550-2 through 550-8, then those circuits output the SEL signal as their respective SELN signal.

The SELN signals cause each of the selector circuits 580-2 through 580-7 to output the signal connected to their respective "02" terminals. The $EP_N$ signals cause the associated ones of the MUX circuits 590-2 through 590-7 to also output the selected data signal. As such, data signals $B1_7$ through $B1_2$ are outputted as data bits D7 though D2 occupying bits positions 5 through 0 in the data word/byte currently being formed with the $D_0$ bit occupying the most significant bit position followed by the parity bit. This data byte is shown in FIG. 1 as the 25th data byte.

Similarly, when the insertion section receives the next data byte from the data processor somewhat concurrently with the next CLK1 signal, 1/8 decoder 540 is cleared by the presence of the CLK1 signal and absence of the TC pulse.

Also, the DSEL signal is updated to equal SEL by the current CLK1 signal supplied to generator 525. Since the N values connected to MUX select circuits 550-1 and 550-2 are still less than the value of the SEL signal, then those circuits output the current value of the DSEL signal (i.e., 010) to selector 580-0 and 580-1, respectively. Also, since N=2= SEL for MUX select circuit 550-2, then that circuit outputs the SEL signal as its SEL2 signal. Moreover, since each of the different values of N connected to MUX selector circuits 550-3 through 550-8 is >SEL, then those circuits still output the SEL signal as their respective SELN signal. All of the MUX select circuits 550-i thus output a signal having a value of 010 to their respective 8 to 1 selector circuit 580. The 010 signal prompts the respective selector 580-i to output to the associated MUX 590-i the data bit supplied to its respective terminal 02. Accordingly, selector 580-0 outputs the data signal $B0_1$ for data bit position D7. The respective combinations of the SELN and $EP_N$ signals supplied to selector circuits 580-1 through 580-7 cause those circuits to output the data signal connected to their respective "01" terminals and cause the associated ones of the MUX circuits 590-1 through 590-7 to also output the selected data signal. As such, inputs $B1_7$ through $B1_0$ are outputted as data bits D7 though D1 occupying bits positions 6 through 0 in the data word/byte with the D1 bit occupying the most significant bit position. The third through twelfth data bytes of the third group of data bytes as well as the fourth through seventh groups of data bytes are formed similarly.

It will thus be appreciated that, although the invention illustrated herein is described in the context of a specific illustrative embodiment, those skilled in the art will be able to devise numerous alternative arrangement which, although, not explicitly shown or described herein, nevertheless, embody the principles of invention and are within its spirit and scope.

I claim:

1. A parity bit extraction circuit for extracting parity bits from a parallel stream wherein a parity bit is formed over each of N groups of data bytes in the parallel stream, with M data bytes in each group, where M>1 and N>1, the extraction circuit comprising:

apparatus that identifies receipt of a first data byte of each group of received data bytes and identifies each of the N groups of data bytes, and selector apparatus that uses the group identity to identify the parity bit position and the byte identity to identify the byte containing the parity bit and extracts the parity bit for each of the N groups of data bytes from the parallel stream without serializing the parallel stream.

2. The parity bit extraction circuit of claim 1, wherein the identifying apparatus includes a first counter that counts each data byte of a group as it is received and outputs a signal, TC, when the count reaches M, and includes a second counter that counts each such outputted signal to identify each of said groups by a corresponding counter value, SEL.

3. The parity bit extraction circuit of claim 2, wherein the selector apparatus includes first and second latch circuits that respectively store the most current one and next most current one of the received data bytes and further includes a plurality of selector circuits each having data inputs connected to individual ones of the outputs of the first and second latches and a control input connected to the output of the second counter such that each selector circuit outputs the data bit supplied to that one of its inputs corresponding to the value of signal outputted by the second counter.

4. The parity bit extraction circuit of claim 3, wherein the selector apparatus further includes a parity-bit selector circuit whose inputs are connected to individual ones of the outputs of the first latch circuit and a control input connected to the output of the second counter such that the parity-bit selector circuit extracts and outputs the parity when the following data byte is latched into the first latch circuit.

5. The parity bit extraction circuit of claim 1, wherein the parity bit extraction circuit is one of a plurality of circuits forming an ASIC.

6. The parity bit extraction circuit of claim 1, wherein M=12 and N=8.

7. The parity bit extraction circuit of claim 1, wherein the parallel stream is received at a predetermined clock rate and the parity bit extraction circuit operates at the predetermined clock rate.

8. A parity bit insertion circuit for inserting parity bits into a parallel stream, wherein a parity bit is formed over each of N groups of data bytes in the parallel stream, with M data bytes in each group, where M>1 and N>1, the insertion circuit comprising:

apparatus that identifies receipt of a first data byte of each group of received data bytes and identifies each of the N groups of data bytes, and selector apparatus that uses the group identity to identify the parity bit position and the byte identity to identify the byte for the parity bit and inserts the parity bit for each of the N groups of data bytes into the parallel stream without serializing the parallel stream.

9. The parity bit insertion circuit of claim 1, wherein the selector apparatus comprises:

conversion apparatus that, responsive to the second counter apparatus output signal, converts for one clock cycle the value of a delayed version of the second counter output signal into a corresponding one-out-of-N signal;

first and second latch circuits that respectively store the most current one and next most current one of the received data bytes;

N selector circuits each having data inputs connected to individual ones of the outputs of the first and second latches such that each selector circuit outputs the data bit supplied to that one of its inputs corresponding to the value of a signal derived from the second counter output signal, wherein each of the one-out-of-N signals is associated with a respective one of the N selector circuits; and apparatus that substitutes the parity bit for the data bit outputted by that one of selector circuits associated with the corresponding one-out-of-N signal.

10. The parity bit insertion circuit of claim 8, wherein the parallel stream is received at a predetermined clock rate, and the parity bit insertion circuit operates at the predetermined clock rate.

11. The parity bit insertion circuit of claim 8, wherein the apparatus that identifies comprises:

first counter apparatus that outputs a signal that identifies a current group of data bytes, and second counter apparatus that counts each data byte of a group and outputs a signal, TC, when it has counted the last data byte of the group being counted, wherein the second counter output signal increments the first counter apparatus output signal so that it identifies the next group of data bytes to be counted.

12. The parity bit insertion circuit of claim 8, wherein M=12 and N=8.

13. The parity bit insertion circuit of claim 9, wherein the apparatus that substitutes is a 1-out-of-2 multiplexer and wherein the parity bit is inserted into a data byte that follows in time a respective group of data bytes such that the parity bit propagates through each bit sition of the data byte at the end of the respective group.

* * * * *